United States Patent Office 3,577,442
Patented May 4, 1971

3,577,442
1-(DICARBOXYPHENYL)-INDANE DICARBOXYLIC
ACID DIANHYDRIDE
Howard V. Holler, Oakland, Calif., assignor to Shell Oil
Company, New York, N.Y.
No Drawing. Filed Nov. 12, 1968, Ser. No. 776,000
Int. Cl. C07c 63/48, 63/02
U.S. Cl. 260—346.3          2 Claims

ABSTRACT OF THE DISCLOSURE

The novel compounds 1-(3',4'-dicarboxyphenyl)-1,3,3-trimethyl-5,6 and 6,7-indane dicarboxylic dianhydrides, useful as curing agents for epoxy resins, are prepared by the dehydration of the corresponding novel tetracarboxylic acids. The acids are formed by oxidation of the isomeric dimers of 1,2-dimethyl-4-isopropenylbenzene.

This invention relates to novel arylindane tetracarboxylic acids (III) and the corresponding dianhydrides (IV) having the respective formulas:

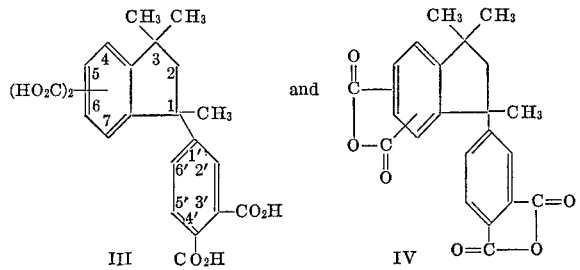

For simplification, these compounds may be referred to hereinafter as III and IV. Further, this invention relates to the preparation and application of these novel materials.

BACKGROUND OF THE INVENTION

A considerable amount of commercial interest is centered around 1-phenylindane compounds, especially certain 1-(carboxyphenyl)-indane carboxylic acids. The preparation of these acids by the dehydration and dimerization of alpha-hydroxyalkyl benzoic acids is disclosed in U.S. Pat. 3,102,135. Uses of these materials in alkyd resins, in esters used to plasticize vinyl chloride polymers, and as a substitute for phthalic acids in the preparation of polyesters are also known.

All prior disclosures have dealt with dicarboxylic acids. There is no disclosure of the preparation and the unusually attractive properties of the 1-(dicarboxyphenyl)-indane dicarboxylic acids and the corresponding dinanhydrides. These tetracarboxylic acids and dianhydrides have theretofore been unknown.

STATEMENT OF THE INVENTION

It has now been found that the novel tetracarboxylic acids III can be prepared by the oxidation of 1-(3,4-dimethylphenyl)-1,3,3,5,6 and 1,3,3,6,7-pentamethylindane. These indane compounds can be prepared by the dimerization of 1,2-dimethyl-4-isopropenylbenzene with protonic or Lewis acid catalyst. The tetracarboxylic acids III thus prepared can be converted to the novel dianhydrides IV by reaction with acetic anhydride or other suitable means of dehydration.

Acids and anhydrides having different alkyl substituents on indane carbon numbers 1 and 3 can be prepared by this procedure using feedstocks such as 1,2-imethyl-4-sec-1-butenylbenzene in place of 1,2-dimethyl-4-isopropenylbenzene.

DESCRIPTION OF PREFERRED EMBODIMENTS OF THE INVENTION

A reaction sequence to form the novel acids and anhydrides of this invention is as follows:

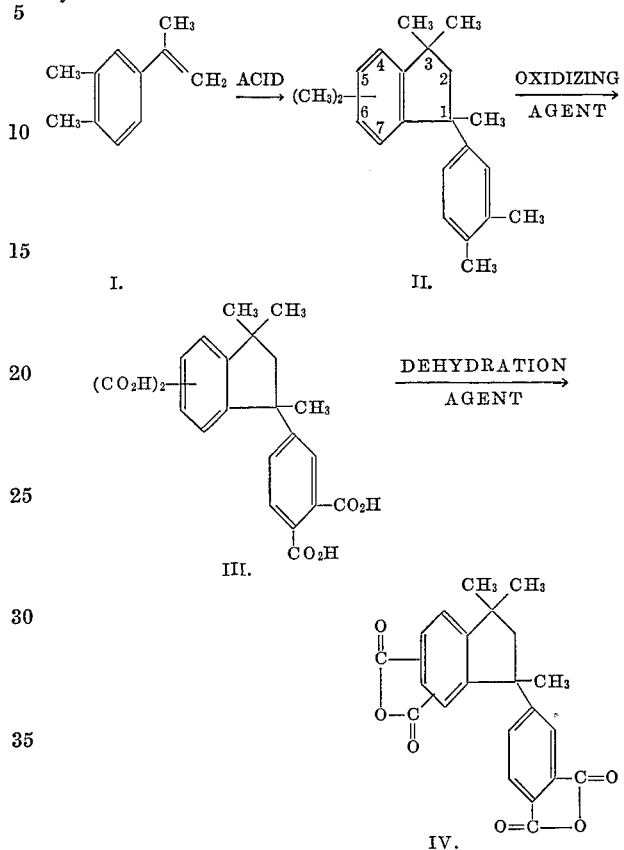

The 1,2-dimethyl-4-isopropenylbenzene feedstock (I) can be readily prepared by the alkylation of orthoxylene with propylene to form 1,2-dimethyl-4-isopropylbenzene which is then dehydrogenated, for example by vapor phase reaction with iodine, to form I. I is then dimerized to form II. The monomer and dimers will be referred to hereinafter as I and II. Depending on the orientation of the two aromatic rings during dimerization, the two methyl groups on the indane aromatic ring of II will be in either the 5 and 6 positions or the 6 and 7 positions, with the 5,6-dimethyl isomer usually predominating. Mixtures comprising from about 40 to 90% of the 5,6 isomer and from about 10 to 60% of 6,7 isomer are useful. Mixtures comprising from about 50 to 75% of the 5,6 isomer and from 25 to 50% of the 6,7 isomer are preferred. These mixtures can be prepared by effecting the dimerization with protonic or Lewis acid catalysts such as mineral acids, aluminum halides and the like. A preferred catalyst is gaseous boron trifluoride which is bubbled through the liquid hydrocarbon. Temperatures above 50° C. are generally acceptable for the dimerization with temperatures of from about 70° C. to about 90° C. being preferred.

The four methyl groups attached directly to the aromatic rings on both isomers of dimer II are selectively oxidized to form corresponding isomeric tetracarboxylic acids III. This oxidation may be carried out at moderate temperatures using $KMnO_4$ in a non-oxidizable medium, such as for example a water and tertiary butyl alcohol medium. Temperatures from about 65° to 95° C. are preferred as they provide rapid oxidation with good selectivity to the tetraacid. Alternatively, other methods of oxidation can be used, such as reaction with molecular oxygen at an elevated temperature in the presence of bromine and compounds of transition metals such as for example cobalt as catalysts.

Dehydration of isomeric tetracarboxylic acids III to isomeric dianhydrides IV may be easily and very completely effected by heating with acetic anhydride, the acetic acid which is formed being easily distilled off. Other conventional dehydrating agents for converting aromatic ortho-dicarboxylic acids to corresponding anhydrides can be used, such as acid halides, e.g. acetyl chloride.

The dianhydrides IV as mixed isomers are useful as a curing agent for epoxy resins. In this service they exhibit two very favorable properties. Conventional dianhydride epoxy resin curing agents, such as benzophenone dicarboxylic anhydride, are high-melting crystalline solids which are compounded with the uncured epoxy resin only with difficulty. It is often necessary to raise the temperature of the resin to above the curing temperature to promote compounding. When uncured mixtures of epoxy resins and conventional curing agents are cooled, the curing agent tends to crystallize out of the blend. It is therefore very difficult to store uncured blends of epoxy resins and curing agent.

Dianhydride IV is an amorphous material which softens at temperatures between about 100–112° C. It is readily soluble in epoxy resins. The low softening temperature and great solubility of anhydride IV in epoxy resins considerably facilitates compounding. An equimolar mixture of dianhydride IV and the diglycidyl ether of Bisphenol A (2,2-bis-p-hydroxyphenylpropane) is easily blended. Before curing, this blend is a viscous fluid at 100° C. At 60–70° C. it becomes putty-like and can be conveniently pressed into molds. With further cooling, this mixture becomes a friable glassy solid suitable for use as a powder-coating material for hot objects or direct molding under heat and pressure. At no time during cooling is there any evidence of separation of dianhydride IV from the mixture.

Use of dianhydride IV as curing agent enhances the properties of cured resins, particularly the heat deflection temperature of the material as determined by ASTM method D 648–56. For epoxy resins cured with conventional agents, such as phthalic anhydride, the temperature at which deflection occurs is about 130–140° C. When dianhydride IV is used as curing agent, the heat deflection temperature is about 193° C.

The invention will be further described and illustrated by the following specific examples.

EXAMPLE I

Preparation of 1-(3',4'-dicarboxyphenyl)-1,3,3-trimethyl-indane-5,6 and 6,7-dicarboxylic acid and the corresponding dianhydride The tetracarboxylic acid III and dianhydride IV were prepared as follows:

A solution of 250 grams (1.71 mols) of I in 50 milliliters of inert solvent ($CCl_4$) was treated with a slow stream of boron trifluoride for 30 minutes at an 80° C. constant temperature to produce 248.5 grams of II (99.4% yield). II was identified by Nuclear Magnetic Resonance analysis which showed no vinyl protons to be present and a 23/5 ratio of aliphatic to aromatic protons. The II product, a clear, a colorless gum, was a mixture of the 5,6-dimethyl-indane derivative and the 6,7 isomer, the 5,6 isomer predominating.

A mixture of 244.4 g. (0.84 mol) of II, 1.5 liters of tertiary butanol, and 1.5 liters of water was heated to 80° C. Excess $KMnO_4$ (8.2 mol) in water was added at this temperature over a 6-hour period. This mixture was maintained at 80° C. for an additional 6-hour period, after which the $MnO_2$ formed was removed, and the organic phase was isolated. Following solvent stripping, 346 grams of III remained. This tan, amorphous carboxylic acid softened at 125–138° C., was soluble in acetone, acetonitrile, methanol and tetrahydrofuran. Analysis of III: Theory: 64.1 carbon, 4.89 hydrogen, 0.97 equivalent of carboxylic acid/100 grams. Found 64.9 carbon, 4.9 hydrogen, 0.93 equivalent of carboxylic acid/100 grams. III was dehydrated to IV. To 319 grams of III was added 995 grams of acetic anhydride and 7.8 grams of acetyl chloride. Excess acetic anhydride and the acetic acid formed were distilled off, and 280 grams of IV were isolated. IV was a tan amorphous solid which softened at 100–112° C. Analysis of IV: Theory: 70.2 carbon, 4.29 hydrogen, 0.53 equivalent of anhydride/100 grams. Found: 69.2 carbon, 4.6 hydrogen, 0.49 equivalent of anhydride/100 grams. The III acid product and the IV anhydride product were greater than 50% m. of the 5,6-isomer and less than 50% m. of the 6,7-isomer.

EXAMPLE II

Use of 1-(3',4'-dicarboxyphenyl)-1,3,3-trimethyl-indane-5,6 and 6,7-dicarboxylic anhydride as an epoxy resin curing agent A 52-gram sample of the dianhydride (IV), containing 0.25 equivalent of anhydride groups prepared as in Example I, was melted at 110° C. Fifty grams of a polyepoxide resin [a glycidyl polyether of 2,2-bis(4-hydroxyphenyl) propane having an average molecular weight of 380 and an epoxide equivalent weight of about 195] containing 0.25 equivalent of epoxide groups was added to the molten dianhydride. The two materials were readily soluble in one another and mixed easily. Finally, 0.20 gram of benzyldimethylamine was added. The resulting viscous mixture was cast into test samples and cured for six hours at 80° C. and six hours at 160° C. The resulting cured material had the following properties:

Barcol hardness: 38

Heat distortion temperature at 264 p.s.i. fiber stress: 193° C.

When phthalic anhydride in equimolar anhydride amount was substituted for the dianhydride with this epoxy resin and with a similar curing procedure, the heat distortion temperature was 134° C.

I claim as my invention:

1. 1 - (3'4'-dicarboxyphenyl) - 1,3,3 - trimethyl-indane-5,6-dicarboxylic acid dianhydride.

2. 1 - (3',4' - dicarboxyphenyl) - 1,3,3 - trimethyl indane-6,7-dicarboxylic acid dianhydride.

References Cited

UNITED STATES PATENTS 3,284,470   11/1966   Farber _____ 260—346.3

ALEX MAZEL, Primary Examiner

B. I. DENTZ, Assistant Examiner

U.S. Cl. X.R.

260—2, 4, 47, 524